S. E. TIMMONS

May 17, 1932. FOLDING WALL TABLE Re. 18,475

Original Filed Jan. 7, 1927

S. E. Timmons
Inventor,

By C. A. Snow & Co.
Attorneys

Reissued May 17, 1932

Re. 18,475

UNITED STATES PATENT OFFICE

SAMUEL E. TIMMONS, OF OKLAHOMA CITY, OKLAHOMA, ASSIGNOR TO ELIZABETH TIMMONS, OF OKLAHOMA CITY, OKLAHOMA

FOLDING WALL TABLE

Original No. 1,796,635, dated March 17, 1931, Serial No. 159,659, filed January 7, 1927. Application for reissue filed November 4, 1931. Serial No. 573,032.

This invention relates to a foldable wall table designed primarily for use in small rooms, means being provided whereby, when the table is not in use, it will be supported in an upstanding position against the wall but, when in use, can be held firmly in a laterally extended position relative to the wall.

A further object is to provide the table with legs for the outer or free ends thereof, these legs being foldable into the table when not in use.

A further object is to provide the table with means whereby foldable chairs can be stored therein, an additional receptacle being located within the table for holding linens or other articles.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings, the preferred form of the invention has been shown.

Figure 1:
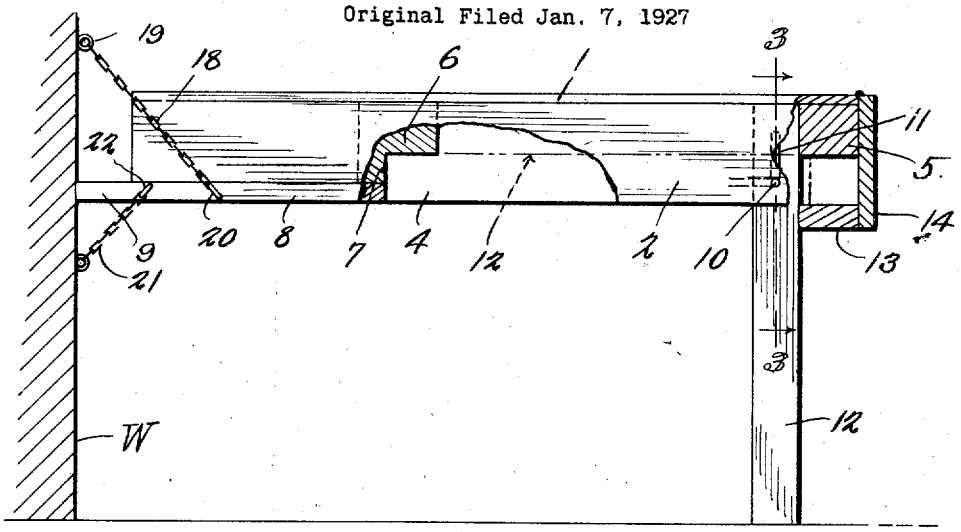
Figure 1 is a view partly in side elevation and partly in section showing the table set up for use.

Referring to the figures by characters of reference 1 designates the table top secured, along its sides, with side strips 2. Inner side strips 3 are secured to the top 1 parallel to the strips 2 and spaced inwardly therefrom. Thus parallel channels or recesses 4 are provided, there being a block 5 secured within the front end of each panel and another block 6 with a recess 7 in its lower face secured in each panel at a point between the ends thereof. A board 8 closes all portions of the bottom of the table except the channels 4 and is extended beyond the back end of the table to provide a projecting ledge 9.

Extending transversely through the front end portion of each of the recesses 4 is a pivot pin 10 and each pin projects through a short longitudinal slot 11 formed in one portion of a leg 12. This leg, when not in use, is seated within one of the recesses 4 with its free end in the recessed lower face of the block 6. When it is desired to use the leg for supporing the table, however, the same is swung to a position at right angles to the table top and is then thrust upwardly against the top 1 where it is held against swinging movement by abutment against the block 5. To fold the leg the same is pulled downwardly relative to its pivot pin 10 and then swung back into the recess 4 as indicated by broken lines in Figure 1.

A cross strip 13 is extended under the bottom 8 at the front end thereof. A jaw 14 is hingedly connected to the front edge of the top 1 and normally closed as the space between the inner side strips 3. This space, which has been indicated generally at 15, is adapted to receive small folded chairs C or other articles when not in use. If desired a drawer 16 of sheet metal or other suitable material can be slidably mounted within the upper portion of the space 15, said drawer having laterally extending flanges 17 slidably engaging the strips 3. The drawer is normally concealed by the door 14 but by opening the door said drawer can be reached and pulled outwardly readily. This drawer can be used for holding table linens and the like.

Figure 2:
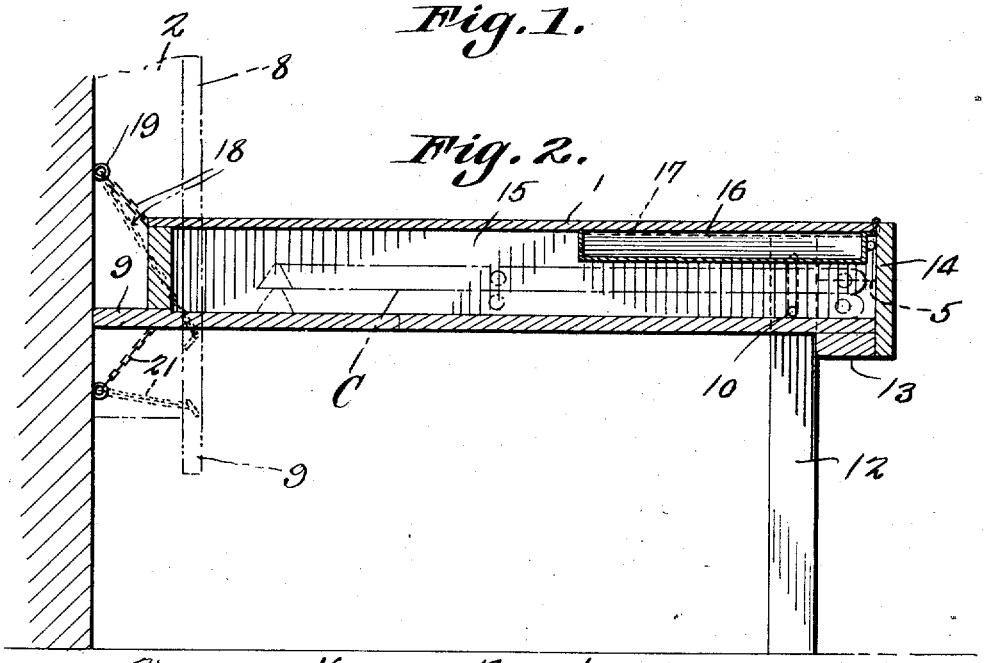
Figure 2 is a central vertical longitudinal section therethrough, the position of the table when folded against the wall being indicated by broken lines.
Figure 3:
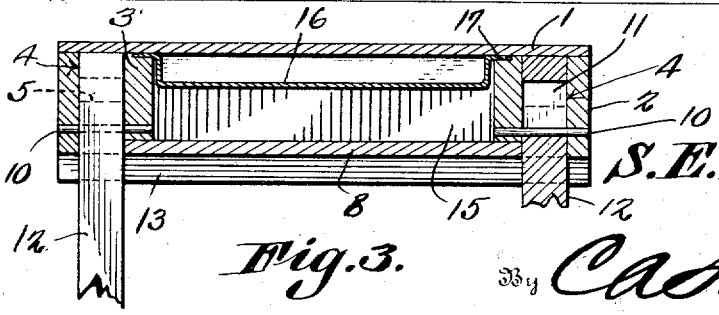
Figure 3 is a section on line 3—3, Figure 1.

In practice a pair of supports, which can be chains 18, are utilized for supporting one end of the table from a wall W or the like. These chains are attached at their upper ends to the wall as shown at 19 while their lower ends are secured to the sides of the bottom board 8 as shown at 20. Additional supports, such as chains 21 or the like, are secured to the wall W at a point below the table top and are inclined upwardly and attached, as at 22, to the bottom of the table top at a point between the wall and the lower ends of the chains 18. These chains are so proportioned that when the table is not in use they will support said table in a substantially vertical position flat against the wall W as shown by broken lines in Figure 2. When the table is in use, however, the inner end thereof will be firmly supported by the chains both against upward and downward movement while the outer ends will be supported by the legs 12. When the table is in either of these two positions the weight thereof bearing on the chains 18 and 21 serves to force the table firmly against the wall.

What is claimed is:

The combination with a fixed upstanding structure having a plane surface, of a table top, supporting elements secured to the upstanding structure and inclined downwardly away therefrom, said elements being located entirely outside of the upstanding structure, the lower ends of said elements being attached to the top of the table adjacent one end thereby to hold said end of the table by gravity against the plane surface of the upstanding structure, elements secured to the upstanding structure and extending upwardly away therefrom, said elements being located entirely outside of the upstanding structure, the upper ends of said elements being attached to the table top near one end to hold it against upward swinging movement relative to the supporting elements, and legs movably connected to that end of the table top remote from the upstanding structure and constituting means for supporting said end when the table top is set up for use, said elements cooperating with the table top to hold it in an upstanding position and maintain it by gravity against the upstanding structure while in either extreme position or in any intermediate position, thereby to prevent the table top from pounding against the upstanding structure.

In testimony that I claim the foregoing as my own, I have hereto affixed my signature.

SAMUEL E. TIMMONS.